(12) United States Patent
Srinivasan et al.

(10) Patent No.: US 6,751,647 B1
(45) Date of Patent: Jun. 15, 2004

(54) METHOD AND APPARATUS FOR AUTOMATED DATA EXCHANGE BETWEEN A USER COMPUTER AND A PROVIDER COMPUTER USING IMPROVED OBJECT-ORIENTED PROGRAMMING COMPONENTS

(75) Inventors: Krishnamurthy Srinivasan, Chandler, AZ (US); George Patrick Moakley, Phoenix, AZ (US); Christopher Scott Thomas, Newberg, OR (US)

(73) Assignee: Intel Corporation, Santa Clara, CA (US)

( * ) Notice: Subject to any disclaimer, the term of this patent is extended or adjusted under 35 U.S.C. 154(b) by 864 days.

(21) Appl. No.: 09/100,227

(22) Filed: Jun. 19, 1998

(51) Int. Cl.$^7$ ............................................. G06F 15/16
(52) U.S. Cl. ...................................................... 709/203
(58) Field of Search .............................. 709/202, 203, 709/227, 235, 201, 310, 313, 314, 315, 316, 317; 705/34, 39

(56) References Cited

U.S. PATENT DOCUMENTS 5,696,965 A  * 12/1997 Dedrick ........................ 707/10
5,828,840 A  * 10/1998 Cowan et al. ............... 709/203
6,016,484 A  * 1/2000 Williams et al. ............... 705/39
6,026,379 A  * 2/2000 Haller et al. .................. 705/34
6,083,276 A  * 7/2000 Davidson et al. .............. 717/1
6,085,030 A  * 7/2000 Whitehead et al. ..... 395/200.33

OTHER PUBLICATIONS

Lewis, "CORBA 2.0: Universal Networked Objects", Sep. 1995, StandardView, vol. 3, No. 3, pp. 102–106.*
"A Discussion of the Object Management Architecture", Jan. 1997, Object Management Group., Inc.*
"Recommendations for Using DCE, DCOM, and CORBA Middleware", Apr. 1998, The Mitre Corporation, MITRE–DAS–C1.*
"A Corba Primer", no date, Segue, white paper—Segue Software, CORBA primer.*

* cited by examiner

*Primary Examiner*—Paul H. Kang
(74) *Attorney, Agent, or Firm*—Kenyon & Kenyon

(57) ABSTRACT

An apparatus for exchanging data between a user computer and a provider computer is disclosed. The apparatus includes a component, a first interface to an application resident on the user computer, and a second interface to the provider computer. The components includes executable instructions for transferring data between the user computer and the provider computer. The apparatus also includes a documentation module containing rules for exchanging data between the user computer and the provider computer.

25 Claims, 4 Drawing Sheets

METHOD AND APPARATUS FOR AUTOMATED DATA EXCHANGE BETWEEN A USER COMPUTER AND A PROVIDER COMPUTER USING IMPROVED OBJECT-ORIENTED PROGRAMMING COMPONENTS

FIELD OF THE INVENTION

The present invention relates generally to the field of personal computing, and in particular to a method and apparatus for automated data exchange between computers over a network.

BACKGROUND OF THE INVENTION

The Internet and the World Wide Web have dramatically changed the nature of business computing. New and expanded opportunities for business-to-business computing are emerging under the umbrella of so-called "E-business"—the execution of business processes with the assistance of Internet technologies.

The development of E-business on the Internet is following a track similar to that experienced by intra-corporate business computing. Early networking within corporations typically consisted of mainframe-connected terminals. Users were limited to viewing and entering data, and had to pore over printouts and reports to analyze their data. Decision making was a function of back-end systems. The advent of the personal computer (PC), and applications like spreadsheets enabled users to use their data, bringing reporting, analysis and presentation onto the desktop. The result was a marked increase in users' ability to act quickly, thereby heightening corporations' business agility.

Internet computing is on a similar path. With browsers and the World Wide Web ("the Web"), the Internet today is largely used for viewing and entering data. The pivotal change that is currently underway is moving the industry towards a more interactive Internet that enables applications to not only view, but also to make active use of data. As this transition occurs, there is a need for business systems to evolve from the current "vendor-centric" model to a "customer-centric" model. In this context, the term "vendor" is intended to refer not just to a provider of products, but also more generally to a provider of information (e.g., a server computer). Similarly, "customer" is intended to refer not just to a purchaser, but also more generally to a receiver of information (e.g., a client computer).

To illustrate the vendor-centric nature of the Internet today, consider a typical business use of the Web where a vendor sponsors a web site to make information concerning the vendor's goods available for viewing by its customers. Such a web site would typically reside on a web server that might have access to data maintained by one or more "legacy" systems in the vendor's enterprise (e.g., an inventory system, an order processing system). A customer can then use a web browser to view information from the web site by issuing an HTTP (HyperText Transfer Protocol) request, to which the web site would respond by downloading the requested information in an HTML (HyperText Markup Language) document. This arrangement is considered vendor-centric because the customer must effectively go to the vendor for the desired information. The customer has very little control over the format in which the information is presented, and cannot integrate the information with information from other sources except by cut-and-paste.

Another typical vendor-centric use of the Internet today is exemplified by storefront-type web sites that enable a customer to go to a single location to get information from multiple sources. For example, consider a web site sponsored by a travel service that allows users to reserve airline tickets, hotel rooms, rental cars, and so on. In such an arrangement, the travel service's web site would reside on a web server that might interface with a number of other web servers respectively associated with various vendors (e.g., an airline, a hotel, a rental car company). The travel service's web server, though likely interacting with these other web servers in much the same way that a customer would directly, serves as a source of consolidated information. Nevertheless, even in this somewhat more sophisticated arrangement, the emphasis is still on the customer going to the vendor to get information.

While the Internet has certainly enhanced the ability to do business electronically, vendor-centric implementations such as those described above are relatively inflexible when it comes to meeting the needs of any particular customer. Rather, the approach is more in the nature of "one size fits all," meaning there is typically only one way of obtaining information from the vendor (e.g., downloading a web page), and that information may or may not meet a given customer's particular needs.

Embodiments of the present invention are directed, at least in part, to providing tools that enable a shift from the present vendor-centric business uses of the Internet to more customer-centric uses. Such embodiments aim to provide the type of customer-centric interactions previously associated with electronic data interchange (EDI) applications, but without the rigidity inherent in EDI. This goal is accomplished through the use of "E-business components" that enable a high-degree of user flexibility through features such as mobile/disconnected use, real-time alerts, and information embedded in a customer's application context. E-business components enable truly customer-centric interactions on the Internet, and make it possible for businesses to form partnerships with minimal effort.

SUMMARY OF THE INVENTION

The present invention is directed generally to apparatus and methods for exchanging data between computers. In accordance with embodiments of the present invention, an improved component is provided for facilitating E-business processes over a network such as the Internet. Such embodiments promote a shift from the vendor-centric approach of existing E-business processes to a more flexible customer-centric approach.

In accordance with one particular embodiment, an apparatus for exchanging data between a user computer and a provider computer includes a component having executable instructions for transferring data between the user computer and the provider computer. The component also includes a first interface to an application resident on the user computer and a second interface to the provider computer. In addition, the apparatus includes a documentation module containing rules for exchanging data between the user computer and the provider computer.

DETAILED DESCRIPTION

Electronic data interchange, or EDI, provides a customer-centric model for business-to-business computing. See generally Phyllis K. Sokol, EDI: THE COMPETITIVE EDGE (McGraw-Hill 1989). EDI, however, does not promote the level of agility that businesses typically desire, requiring elaborate prior arrangements between participating businesses. In contrast to EDI, the World Wide Web is emerging as a platform for businesses to interact with one another without any prior arrangements. However, the Web imposes a documents-based interaction methodology that is not customer-centric because it requires manual interaction with the vendor's web page. In addition, the Web generally does not support access to information when a computer is not connected to a network. Thus, those in the business computing industry have effectively been faced with choosing between rigid customer-centric approaches (e.g., EDI) and flexible vendor-centric approaches (e.g., the Web).

In accordance with embodiments of the present invention, shortcomings of existing business computing technology are addressed using an improvement on an existing type of application building block known as "components." Components are basically embeddable, programmatically available elements that can be incorporated within, for example, client-based or server-based "container" applications. A variety of technologies currently available for developing components, including JAVAAPPLET, ACTIVEX and JAVABEAN. Components are discussed at length in Robert Orfaeli et al., THE ESSENTIAL DISTRIBUTED OBJECTS SURVIVAL GUIDE (1996).

Current component technology is subject to a dichotomy of functionality that sets usage against richness. Where the goal is to promote broad usage (e.g., different operating environments, hardware platforms, etc.), it is generally only possible to configure a component to provide relatively limited functionality. For this reason, components have primarily been used on the Internet only to provide enhanced user interface functionality or minimal read-only access to information. Conversely, while it is possible to configure a component to provide relatively rich functionality, the cost is generally a substantial reduction in breadth of usage. In contrast to existing component technology, embodiments of the present invention permit component technologies to be used in ways that provide both broad usage and extremely rich functionality.

Figure 1:
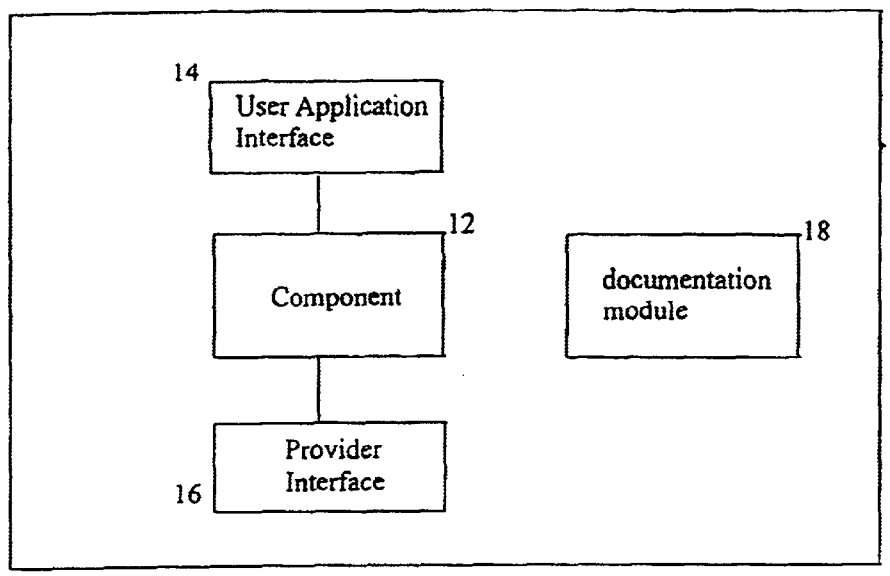
FIG. 1 is a block diagram showing an E-business component for exchanging data between a user computer and a provider computer in accordance with an embodiment of the present invention.

Referring now to the drawings, FIG. 1 illustrates an apparatus for exchanging data between a user computer and a provider computer in accordance with a first embodiment of the present invention. The apparatus comprises a package 10 containing a component 12 and a documentation module 18. Package 10 can be implemented using any type of file capable of supporting components, such as a JAR (JAVA Archive) file, a CAB (Cabinet) file, or an FTP (File Transfer Protocol) file. Similarly, component 12 can be implemented using any component development technology, such as JAVAAPPLET, ACTIVEX and JAVABEAN. In this particular embodiment, component 12 includes a user application interface 14 for communicating with an application resident on the user computer (not shown), and a provider interface 16 for communicating with the provider computer (not shown). Component 12 includes a set of executable instructions configured to perform, for example, a business-related function. To distinguish it from existing component technology, package 10 can be referred to as an E-business component.

Documentation module 18, which contains textual information for communicating to a user particular properties of component 12, may be implemented using any readily-viewable file format suitable for displaying text, such as a WINDOWS NOTEPAD file, a WORD file, or a WORDPERFECT file. Such properties may include, for example, both technical properties and business properties that the user would need to know in order to fully exploit the component. Technical properties include such things as: the threading model to which component 12 conforms; whether component 12 maintains state; whether component 12 can participate in transactions; whether component 12 must be connected to an associated server computer to function, or whether it can also operate off-line; whether component 12 connects to an associated server computer on a per session or a per message basis; whether component 12 publishes notifications, and so on. Business properties include such things as: the syntax and semantics of user application interface 14 and provider interface 16; the functionality of component 12; information relating to privacy and security considerations (e.g., if user accesses are logged, what information is captured about the user, what information about the user will/can be shared with third parties, etc.); and the level of technical support promised by the component provider. It should be noted that the particular properties identified above, as well as the categories in which those properties are grouped, is presented by way of example only and may vary in accordance with the needs of any particular implementation.

In this embodiment, component 12 includes logic for connecting to, and exchanging information with, a provider computer (not shown) through provider interface 16. Provider interface 16 can be configured to interact with, for example, a component resident on the provider computer, with an application running on the provider computer, with a data store resident on the provider computer, and so on. The user computer on which package 10 is installed must have appropriate network interfacing hardware and software to facilitate the connection to the provider computer. All of the information required by the user computer for connecting to the provider computer should either be transparent to the user of component 12 or documented in documentation module 18.

Information conveyed in documentation module 18 enables component 12 to be configured flexibly. In this embodiment, documentation module 18 contains detailed specifications for interacting with user application interface 14 and provider interface 16. So long as an application complies with those specifications, the application need not be concerned with the particular architecture of component 12, thereby achieving greater flexibility than is typically possible with existing component technology. Additional useful information is available to the user through the contents of component 12 itself. A variety of component viewers are available on the market today, including OLE/COM, OBJECTVIEWER from Microsoft Corporation, and BEANBOX from IBM. Appendix I contains parts of the code for a sample component configured in accordance with an embodiment such as that shown in FIG. 1.

Package 10 may be configured for uni-directional or bi-directional exchanges of data with a provider computer. For example, component 12 may only be able to retrieve data from a particular web site or from a data store (e.g., a database) resident on some particular computer (whether the component provider's or some third party). Alternatively, component 12 may be configured to transfer information to the provider computer for the purpose of updating a data store. Similarly, component 12 may be configured to only receive information in response to requests that it generates, or it may be configured to receive information that is "pushed" to it.

As noted above, component 12 can be used to facilitate multi-stage transactions between the user computer and the computer. This can be done primarily using logic resident in component 12 and corresponding logic running on the provider computer, but can also be implemented in conjunction with known transaction processing applications. Where component 12 participates in transaction processing, it is useful for component 12 to save state for any data stores that it updates to enable a rollback in the event a transaction fails to complete successfully.

Figure 2:
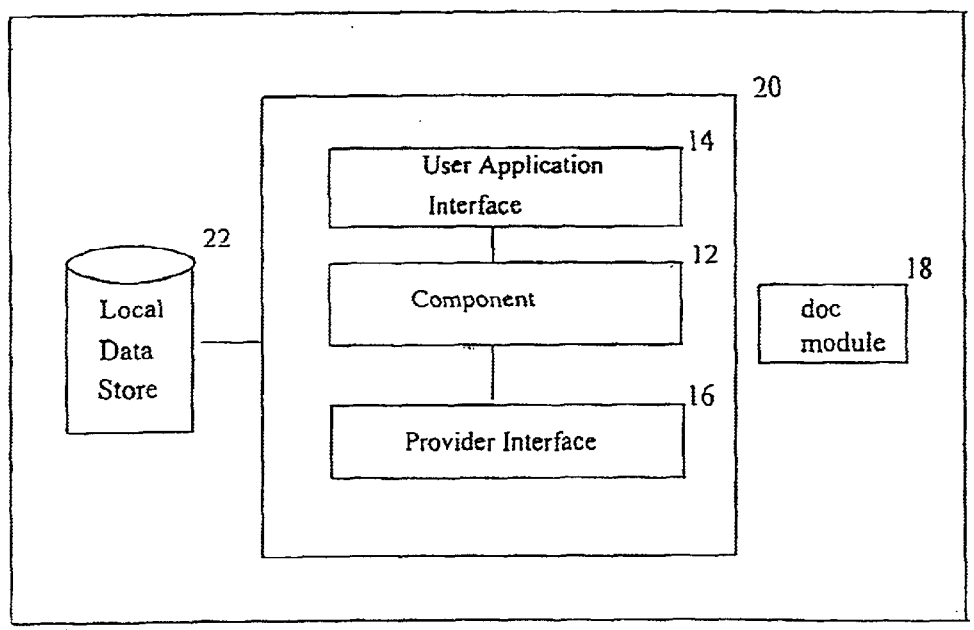
FIG. 2 is a block diagram showing an E-business component for exchanging data between a user computer and a provider computer in accordance with another embodiment of the present invention.

Referring now to FIG. 2, in accordance with another embodiment of the present invention, component 12 is bundled with a container application 20. Container application 20 may comprise, for example, an application enabling a user of component 12 to perform some business function using information obtained from a provider computer (not shown), such as a spreadsheet application. Alternatively, container application 20 can serve simply as a sample application, showing the user a possible way of using component 12 to assist the user in developing his or her own customized application.

In the embodiment shown in FIG. 2, package 10 also includes a local data store 22 to which component 12 has read/write access. In one particular implementation, local data store 22 comprises a file that is physically included in package 10. Alternatively, or in addition, local data store 22 can be an area of memory resident on the user computer that is allocated when component 12 is loaded. Local data store 22 can be pre-loaded with data from the provider of the component, enabling component 12 to furnish such information to a user without having to access the provider's computer. Thus, local data store 22 facilitates off-line operations of component 12. Similarly, local data store 22 can be used to temporarily store information to be transferred from the user computer to the provider computer when the respective computers are not connected. Local data store 22 therefore provides a user of component 12 with substantially greater flexibility, since many functions can be performed in the absence of a network connection. Indeed, container application 20 can be configured in such a way that the user generally does not have to be concerned with whether there is a network connection established.

Local data store 22 can be used to store a local copy of a data entity resident on the provider computer, such as a database, a file, a table, a record, etc. Again, such an implementation is useful for facilitating off-line operation of component 12. In order to ensure that the local copy is current, component 12 can be configured to automatically retrieve an updated version of the data entity from the provider computer whenever a new network connection is established, periodically during a time of extended network connection, or in response to some triggering event.

To further illustrate some of the features and benefits of the present invention, consider an example where an E-business component configured in accordance with the embodiment illustrated in FIG. 2 is provided to a customer by a manufacturer. In this example, the E-business component is configured to provide the customer with the ability to automatically check the prices of various products and to place orders from within the customer's own business application. Where appropriate, the following description refers to particular structures shown in FIG. 2.

In this example, component 12 is a JAVABEAN component (see sample code in Appendix I), container application 20 is an EXCEL spreadsheet, documentation module 18 is a WORD97 file, and package 10 is a JAR file. Persons skilled in the art will recognize, however, that many variations are possible. Documentation module 18 conveys information to facilitate the customer's use of component 12. For example, documentation module 18 includes an "Introduction" section that advises the reader of the general function and capabilities of the E-business component. Documentation module 18 also includes a section describing system requirements for running component 12, addressing platform requirements (e.g., operating system(s), processor, memory, disk space), software requirements (e.g., networking software), and security requirements (e.g., HTTP and TCP ports used for exchanging data with the provider computer). In addition, documentation module 18 includes a detailed discussion relating to the effective use of component 12, covering such areas as downloading and installation instructions, usage instructions, description of sample applications, intermittent connectivity support, instructions for in-process versus out-of-process operations, transactional support, and conditions that the manufacturer places on the use of its E-business component (e.g., agreement to limit use of the E-business component to interacting (whether directly or indirectly) with the manufacturer, agreement to display appropriate trademark and/or copyright notices). Appendix II contains sample text that may be included in documentation module 18.

Figure 3:
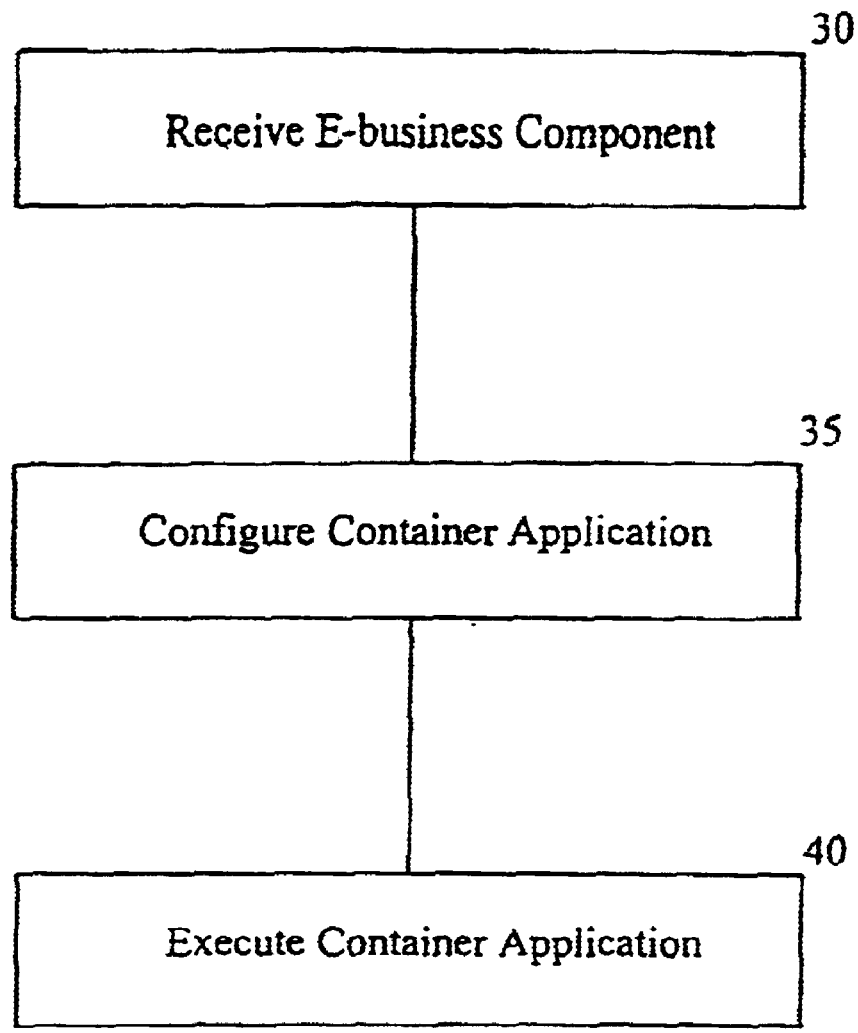
FIG. 3 is a flow diagram illustrating a method for exchanging data between a user computer and a provider computer in accordance with an embodiment of the present invention.
Figure 4:
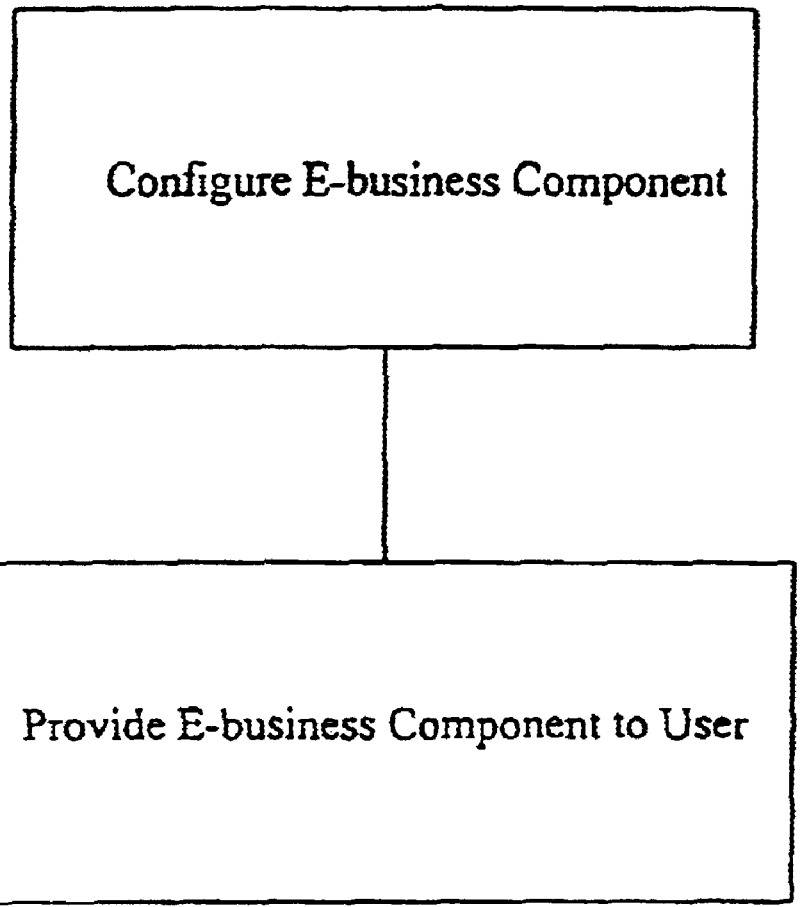
FIG. 4 is a flow diagram illustrating a method for exchanging data between a user computer and a provider computer in accordance with another embodiment of the present invention.

By way of further illustration, FIG. 3 and FIG. 4 are block diagrams describing methods for using E-business components such as those described above to exchange data between two computers. FIG. 3 shows an embodiment of a method performed by a user of an E-business component, and FIG. 4 shows an embodiment of a method performed by a provider of an E-business component.

Referring now to FIG. 3, in accordance with this embodiment an E-business component is received by a user (Step 30). As discussed above with reference to other embodiments, the E-business component contains a component and a documentation module. In general, the component includes logic for exchanging data between a user computer and a provider computer, and the documentation module describes various rules, procedures, parameters, and so on for use of the component.

Persons skilled in the art will recognize that distribution of the E-business component can be accomplished in a number of different ways. For example, the user can access a web site maintained by the component provider and request that the E-business component be downloaded. Alternatively, the E-business component can be distributed on a portable storage medium, such as a diskette or a CD-ROM. The E-business component could also be pre-loaded on a computer prior to distribution of the computer to customers.

After the E-business component is received, the user configures an application on the user computer to exchange data with the provider computer using the E-business component (Step 35). Where the E-business component includes a container application, this configuration step can comprise little more than ensuring that the container application is supported by the user computer. On the other hand, the user may develop a customized application for using the E-business component. In such a case, this step may comprise configuring the customized application to interface with the component in accordance with the rules set forth in the documentation module. The properly-configured application can then be executed to exchange data between the user computer and the provider computer (Step 40).

FIG. 4 illustrates a method in accordance with another embodiment of the present invention. In accordance with this embodiment, an E-business component is configured by, for example, a provider of information or an intermediary (Step 50). As discussed above with reference to other embodiments, the E-business component contains a component and a documentation module. In general, the component includes logic for exchanging data between a user computer and a provider computer, and the documentation module describes various rules, procedures, parameters, and so on for use of the component. The E-business component is then provided to a user computer (Step 55). As discussed above, persons skilled in the art will recognize that distribution of the E-business component can be accomplished in a number of different ways. For example, the user can access a web site maintained by the provider of the E-business component and request that the E-business component be downloaded. Alternatively, the E-business component can be distributed on a portable storage medium, such as a diskette or a CD-ROM. The E-business component could also be pre-loaded on a computer prior to distribution of the computer to customers.

Figure 5:
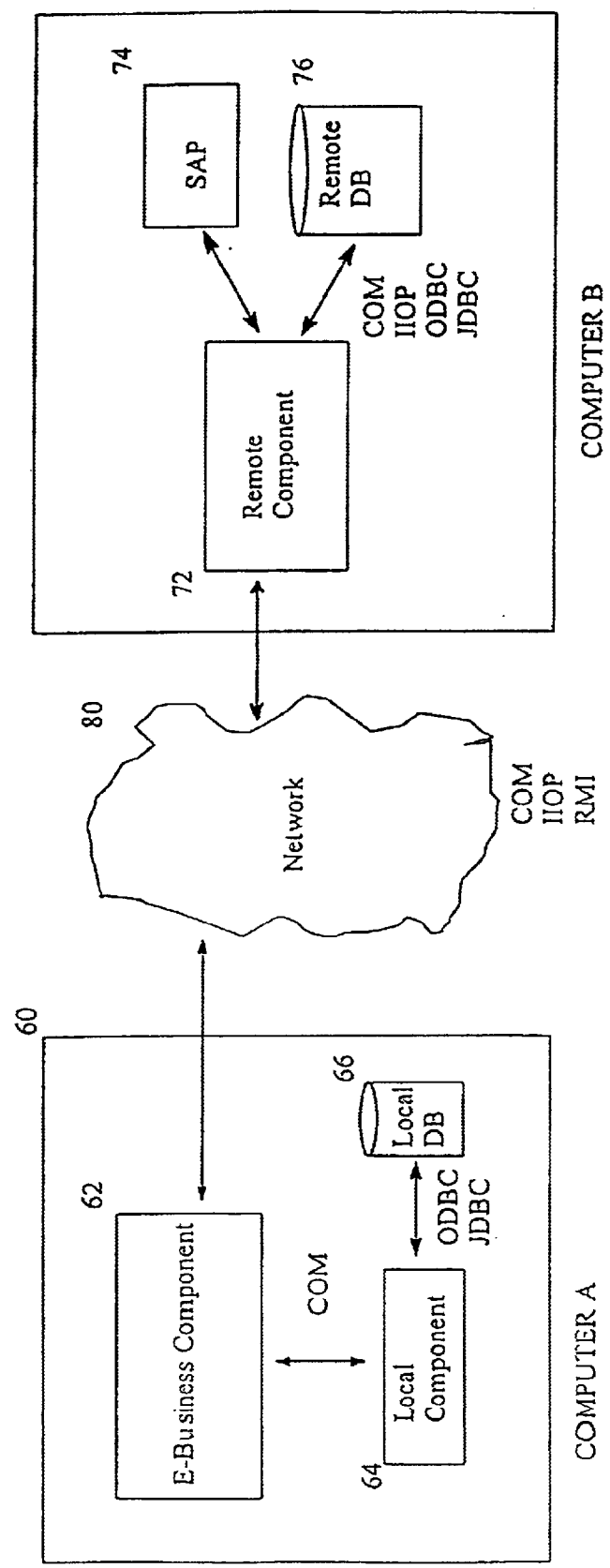
FIG. 5 illustrates a system architecture for exchanging data between two computers in accordance with an embodiment of the present invention, whereby off-line operation is supported.

To further illustrate the type of expanded functionality facilitated by the present invention, FIG. 5 illustrates a system architecture in accordance with an embodiment of the present invention whereby an E-business component for exchanging data between two computers is configured to selectively operate in either an on-line or an off-line mode. In accordance with this embodiment, a first computer 60 and a second computer 70 are capable of communicating with one another over a network 80. In a particular implementation, network 80 comprises the Internet, but the present embodiment is equally applicable to other network configurations.

As shown in FIG. 5, first computer 60 has loaded therein an E-business component 62 such as those described above with reference to FIG. 1 and FIG. 2. First computer 60 also includes a local component 64 that governs access by E-business component 62 to a local database 66. Second computer 70 has loaded therein a remote component 72 that is configured to manage exchanges of data with first computer 60. Remote component 72 is in turn coupled to SAP 74 and remote database 76.

When a network connection exists between first computer 60 and second computer 70, E-business component 62 may receive information from, and provide information to, second computer 70 through remote component 72. Such exchanges of data may occur in either foreground or background mode, meaning a user of first computer 60 does not necessarily have to initiate the exchange or even be aware that it is occurring. Information received from second computer 70 is passed from E-business component 62 to local component 64, which in turn uses the information to update local database 66. In this way, information from second computer 70 can be stored in local database 66 for retrieval by E-business component 62 in response to a user inquiry even when the two computers 60, 70 are not connected. Likewise, when no network connection is established, E-business component 62 can store information in local database 66 for later transmission. To facilitate an arrangement of the type shown in FIG. 5, E-business component 62 can provide documentation identifying a local resource manager to be used for off-line storage (e.g., a database, a message queue, a text file), the component models that a container application should support (e.g., ACTIVEX, JAVABEANS), and the network communication protocols required (e.g., TCP/IP, DCOM, IIOP, RMI).

Like EDI, E-business components in accordance with the embodiments described above enable business entities to establish relationships with one another for the purpose of conducting electronic commerce. However, unlike EDI, E-business components permit such relationships to be established virtually on an ad hoc basis. The provider of the E-business component need only ensure that it provides the recipient with adequate documentation concerning both the business and technical requirements for the relationship.

To facilitate the ready establishment of partnerships through the use of E-business components, it is useful for business entities to settle upon a standardized set of requirements with which the E-business components they use will comply. A list of one possible set of such requirements follows. For ease of reference only, the requirements are categorized into different levels primarily based on whether they pertain to components directed to use within a given business enterprise (Levels 1 and 2) or across business enterprises (Level 3).

Level 1 Requirements

E-business components should be: (1) capable of being used in both single-threaded and multi-threaded environments; (2) capable of participating in a transaction if the component is used to change data at the provider's end; (3) capable of being used from both third generation programming languages (e.g., C++) and scripting languages (e.g., JAVASCRIPT); (4) in the case of "push"-type components, should allow the user to specify the frequency of alerts (e.g., periodically, event based); (5) should ensure that the component name is unique; (6) should notify the user of any persistent changes made to the user's system; (7) should not force the user to upgrade to newer versions of the component in order to continue using existing functionality; (8) should be bundled with at least one sample container application; and (9) should be available for download on the Internet.

Level 2 Requirements

E-business components should be: (1) capable of running in a disconnected (i.e., mobile) mode; and (2) should include "wizards" or other automated help features to assist the user in configuring the component.

Level 3 Requirements

E-business components should be: (1) signed with a signature file issued by a de facto or de jure signing authority to reliably establish the authenticity of the component provider; and (2) should permit the content of communications to be verified by a proxy server or similar tools on the user's side (e.g., parameters passed should be of standard types).

The foregoing list of requirements is presented by way of example only.

The foregoing is a detailed description of particular embodiments of the present invention. However, the invention also embraces all alternatives, modifications and variations that fall within the letter and spirit of the claims, as well as all equivalents of the claimed subject matter. For example, embodiments such as those described above may be used for exchanging data between a client computer and a server computer, between a client computer and a network proxy, or indeed between virtually any two computers used to transfer information over a network. Persons skilled in the art will recognize from the foregoing detailed description that many other alternatives, modifications and variations are possible.

What is claimed:

1. An apparatus for exchanging data between a user computer and a provider computer, said apparatus comprising a package file containing an object-oriented programming component including executable instructions for transferring data between the user computer and the provider computer, a first interface enabling an application resident on the user computer and the object-oriented programming component to interact, a second interface enabling an application resident on the provider computer and the object-oriented programming component to interact, and a documentation module containing rules for using the object-oriented programming component to exchange data between the user computer and the provider computer.

2. The apparatus of claim 1, wherein said object-oriented programming component is operable under a plurality of technical architectures in accordance with the rules in the documentation module.

3. The apparatus of claim 1, wherein said first interface comprises a set of predetermined parameters accessible by the application resident on the user computer.

4. The apparatus of claim 1, wherein said second interface is configured for at least one of providing input to or receiving output from an application running on the provider computer.

5. The apparatus of claim 1, wherein said second interface is configured for retrieving a web page from the provider computer.

6. The apparatus of claim 1, further comprising a local data store accessible by the object-oriented programming component.

7. The apparatus of claim 6, wherein the object-oriented programming component and the first and second interfaces are bundled within a container application.

8. The apparatus of claim 6, wherein said local data store contains a copy of a data provider computer.

9. The apparatus of claim 8, wherein said object-oriented programming component further comprises instructions for retrieving data from said local data store.

10. The apparatus of claim 9, wherein said object-oriented programming component further comprises instructions for retrieving data from said local data store during a period when the user computer is not connected to the provider computer.

11. The apparatus of claim 8, wherein said object-oriented programming component further comprises instructions for updating said copy of the data entity during a period when the user computer is connected to the provider computer.

12. The apparatus of claim 8, wherein said object-oriented programming component further comprises instructions for writing data to said local data store.

13. The apparatus of claim 12, wherein said object-oriented programming component further comprises instructions for buffering data in said local data store during a period when the user computer is not connected to the provider computer.

14. The apparatus of claim 13, wherein said object-oriented programming component further comprises instructions for transferring data from said local data store to the provider computer during a period when the user computer is connected to the provider computer.

15. The apparatus of claim 1, wherein said object-oriented programming component is configured to transfer data between the user computer and the provider computer in response to a request initiated by the provider computer.

16. The apparatus of claim 1, wherein said object-oriented programming component is configured for transferring purchase data to the provider computer.

17. The apparatus of claim 1, wherein said object-oriented programming component comprises instructions for accomplishing a transaction between the user computer and the provider computer.

18. The apparatus of claim 17, wherein said object-oriented programming component further comprises instructions for saving a state of the user computer pending successful completion of the transaction.

19. The apparatus of claim 18, wherein said object-oriented programming component further comprises instructions for restoring the saved state upon failure of the transaction to complete successfully.

20. The apparatus of claim 1, wherein the package file has a file type selected from a group consisting of a JAR (Java Archive) file, a CAB (Cabinet) file, and an FTP (File Transfer Protocol) file.

21. A method for exchanging data between a user computer and a provider computer using an improved object-oriented programming component, said method comprising:

receiving a package file containing an object-oriented programming component and a documentation module, the object-oriented programming component containing executable instructions for exchanging data between the user computer and the provider computer, and the documentation module containing rules for using the object-oriented programming component to exchange data between the user computer and the provider computer;

configuring an application on the user computer to exchange data between the user computer and the provider computer in accordance with the rules in the documentation module; and executing the application to invoke the object-oriented programming component to exchange data between the user computer and the provider computer.

22. A method for exchanging data between a user computer and a provider computer using an improved object-oriented programming component, said method comprising:

configuring a package file containing an object-oriented programming component and a documentation module, the object-oriented programming component containing executable instructions for exchanging data between the user computer and the provider computer, and the documentation module containing rules for using the object-oriented programming component to exchange data between the user computer and the provider computer; and providing the package file to the user computer.

23. The method of claim 22, further comprising transferring data to the user computer in response to a request received from the object-oriented programming component.

24. The method of claim 22, further comprising transferring data to the user computer in response to a request received from the provider computer.

25. The method of claim 22, wherein the object-oriented programming component includes instructions for transferring data to the provider computer, said method further comprising receiving data from the user computer.

\* \* \* \* \*